United States Patent [19]

Linn

[11] Patent Number: 4,856,752

[45] Date of Patent: Aug. 15, 1989

[54] STRUCTURAL ELEMENT FOR A MACHINE TOOL

[75] Inventor: Thomas D. Linn, Holliston, Mass.

[73] Assignee: Boston Digital Corporation, Milford, Mass.

[21] Appl. No.: 35,462

[22] Filed: Apr. 7, 1987

[51] Int. Cl.$^4$ .............................................. B23B 37/00
[52] U.S. Cl. ................................... 248/678; 248/174; 248/346; 29/527.1
[58] Field of Search ............... 248/678, 670, 152, 174, 248/346; 29/149.5 NM, 527.1, 568; 409/235; 220/67, 5 A

[56] References Cited

U.S. PATENT DOCUMENTS

| | | | |
|---|---|---|---|
| 1,748,577 | 2/1930 | Marram | 220/67 |
| 2,535,528 | 12/1950 | Brodbeck | 248/678 X |
| 2,675,276 | 4/1954 | Dougherty | 29/149.5 NM X |
| 2,678,592 | 5/1954 | Wiedman | 248/678 X |
| 2,789,480 | 4/1957 | Wellauer | 409/235 |
| 3,012,689 | 12/1961 | Harris | 220/5 A |
| 3,022,740 | 2/1962 | Wilfley et al. | 248/678 X |
| 3,036,375 | 5/1962 | Schloeser, Jr. et al. | 248/678 X |
| 3,279,690 | 10/1966 | Dodson | 220/67 X |
| 3,348,795 | 10/1967 | Schilling | 248/562 |
| 3,493,201 | 2/1970 | Marran | 248/678 |
| 3,571,906 | 7/1971 | Leiber | 29/149.5 NM X |
| 3,968,712 | 7/1976 | Duncan | 83/477.2 |
| 4,027,841 | 6/1977 | Starterant et al. | 248/346 |
| 4,065,083 | 12/1977 | Gasaway | 248/678 X |
| 4,177,550 | 12/1979 | Sipek et al. | 409/183 X |
| 4,343,073 | 8/1982 | Brems | 29/38 C |
| 4,461,447 | 7/1984 | Gottlob | 248/678 |

Primary Examiner—Alvin C. Chin-Shue
Attorney, Agent, or Firm—Lorusso & Loud

[57] ABSTRACT

A structural element for a precision linear a motion system is provided which is extremely light in weight when compared to cast iron structural components yet provides the necessary rigidity and stability. The structural element is constructed from at least one sheet of sheet material sheared and bent to form the side walls of the structural element which run parallel to a longitudinal axis of the structural element. End surfaces of the structural elements are formed by a flat piece of sheet metal having a shape matching the shape of the side walls and having side sections each of which is spot welded to the inside surfaces of the side walls. Baffles, identical in shape to the end surfaces, are positioned at spaced locations in the longitudinal direction of the structural element. The components of a way system are accurately mounted in a precise alignment by placing the components on layers of any epoxy material which has a high compressive modulus when cured and low shrinkage while curing. The layer of epoxy material, in turn, is placed on an exterior surface of one of the walls of the structural element. The use of the epoxy material avoids uneven mating of the components.

8 Claims, 3 Drawing Sheets

STRUCTURAL ELEMENT FOR A MACHINE TOOL

BACKGROUND OF THE INVENTION

The present invention relates to precision linear motion systems and more particularly it relates to a structural element for precision linear motion systems.

Precision linear motion is required in many types of products such as machine tools, photo plotters, laser welding or cutting machines and robots. To achieve precision linear motion, it is necessary to provide a base for the linear guide system that is structurally stiff enough to minimize deflection caused by the loads carried by the system and cutting forces, if present. In addition, the structure must be dimensionally stable for a period of many years.

The most common material used for precision linear motion systems in the past and in wide use today is cast iron. Many other materials are also used including steel weldments, granite, artificial granite and concrete. With the increasing speed of industrial processes including machining speeds in machine tools, there is demand for lighter structures. Reducing the mass of moving structures reduces the servo power required and increases the sensitivity and dynamic accuracy of the system. There are also secondary benefits to lighter structures including lower shipping costs, lower manufacturing costs and reduced power requirements.

Cast iron, granite and artificial granite structures are heavy by their very nature and cannot be made lightweight due to limitations of the material itself or the processes used to make them. Steel weldments can be made relatively light in weight but experience has shown that they lack long term stability due to the stresses induced by extensive seam welding and are expensive to fabricate and machine.

Traditional materials utilized for manufacturing the components of precision linear motion systems lend themselves to accurate machining in order to obtain a precisely aligned mounting of a way system to the structural elements of the precision linear motion systems. Problems of achieving the necessary precise alignment have resulted when other materials have been used.

An example of such a steel weldment is taught by U.S. Pat. No. 2,789,480, which discloses fabricated structure made of a formed steel plate outer wall with a series of formed steel strips which are bent in a V-shape such that the vertices of the V-shaped strips are welded to the outer wall. In such a structure all of the formed steel elements are seam welded. U.S. Pat. No. 4,177,550 also shows a machine tool having hollow structural steel members which are welded together to form unitary structures. The inventive structure here is also a typical steel weldment which requires expensive and extensive seam welding. Both of the structures taught by these patents require complex welding operations and expensive machining on large machine tools after fabrication.

It is therefore a principal object of the present invention to provide structural components for linear motion systems that weigh significantly less than cast iron, steel weldment or other alternatives yet still provide the necessary rigidity for many applications.

Another object of the present invention is to provide a structural component for linear motion systems which has a simple construction that relies primarily upon spot welding for assembly.

Still another object of the present invention is to provide a very economically constructed machine tool component which may be utilized in machinery requiring linear way systems and which avoids costly machining on large components in order to attach the linear way systems.

SUMMARY OF THE INVENTION

A structural element for a precision linear motion system is provided which is extremely light in weight when compared to cast iron structural components yet provides the necessary rigidity for many applications. The structural element is constructed from one or more sheets of sheet material that make up the sides of the structural elements. When less than four sheets are used in constructing a four sided element, one or two sheets are bent to form more than one side. The various sheets are spot welded to each other.

End surfaces of the structural elements are formed by a flat piece of sheet metal having perpendicular side sections each of which is spot welded to the interior surfaces of the sheets constituting the side surfaces of the structural element. Baffles which are identical in shape to the end surfaces are positioned at spaced locations in the longitudinal direction of the structural element and are also spot welded to the side surface. These baffles ensure that the maximum rigidity and stability are provided by the structural elements.

Other components are attached to the structural elements through the use of weld nuts which are placed in selected locations along the structural element. Layers of an epoxy material which has a high compressive modulus when cured and low shrinkage while curing are placed between the various components to ensure accurate alignment of the components.

These and other objects and features of the present invention will be more clearly understood from the following detailed description which should be read in light of the accompanying drawings in which corresponding reference numerals refer to corresponding parts throughout the several views.

DETAILED DESCRIPTION OF THE PREFERRED EMBODIMENTS

The present invention is directed to a structural element which is constructed out of sheet metal (preferably steel) which is sheared and bent to form the necessary shapes. While a main structural body 12 of a three axis machine tool is the element described below, it should be understood that almost all of the elements of any machine tool may be constructed in a manner similar to the main structural body 12.

Figure 1:
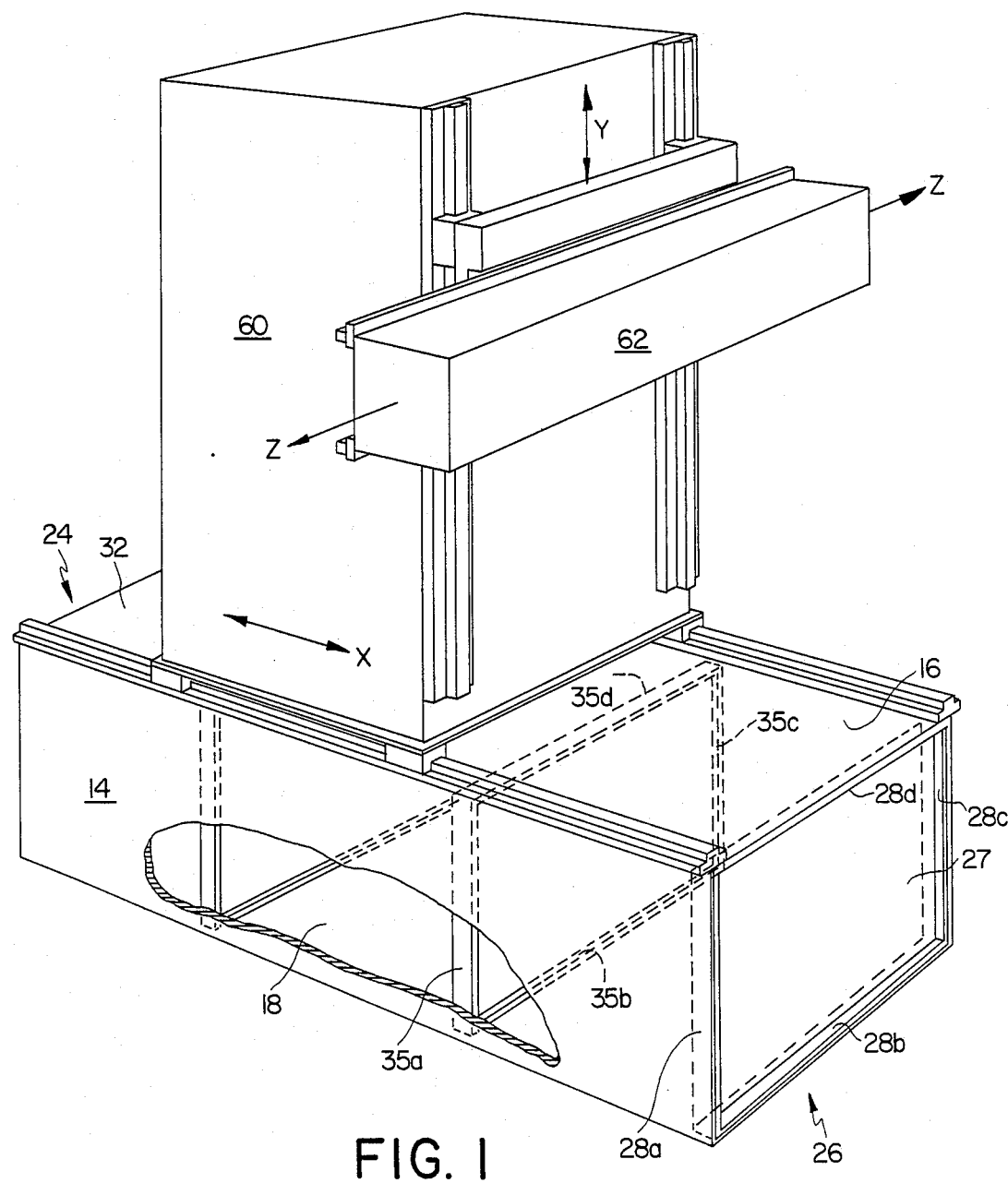
FIG. 1 is a perspective view (partly in section) showing a machining system utilizing the structural elements of the present invention.
Figure 2:
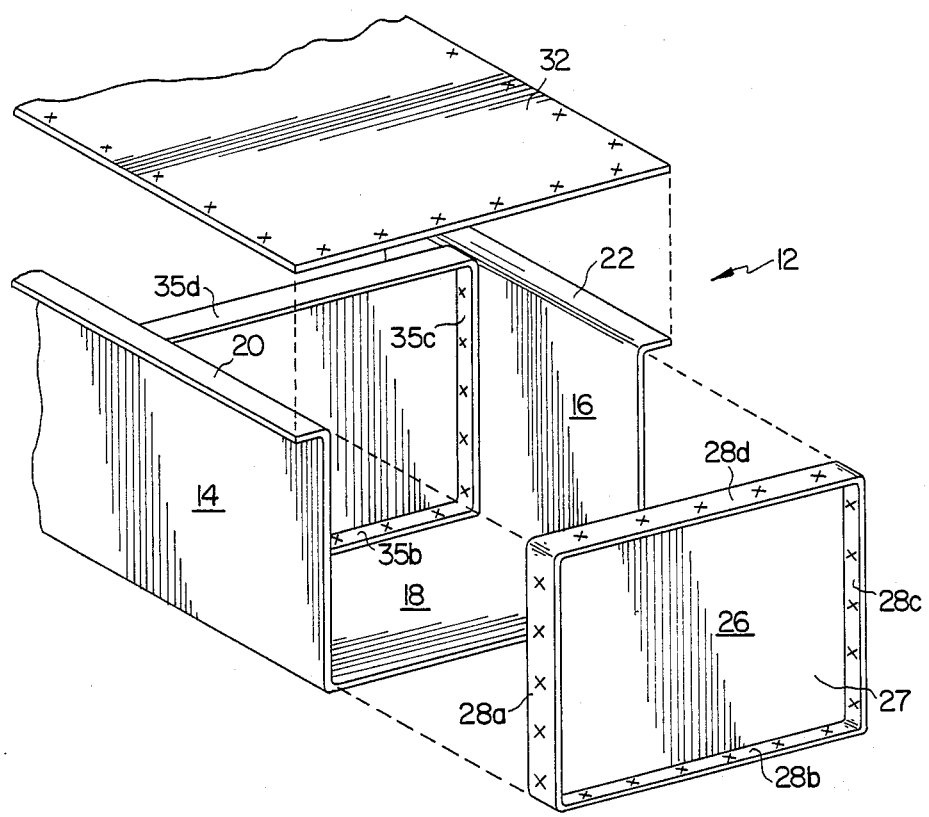
FIG. 2 is a view of the major components of the structural elements utilized in the machine tool of FIG. 1.

Referring to FIGS. 1 and 2, each structural element includes a section of sheet metal which is sheared and bent in order to form three surfaces of the structural element 12. These surfaces are the two side surfaces 14, 16 and the bottom surface 18. The top edges 20, 22 of side surfaces 14, 16 respectively are bent to form a lip, and these lips form essentially right angles with the side surfaces. The side surfaces may also be made up from a different number of sheets of sheet metal, for example two or three sheets, and the top edges need not be bent to form lips. The top surface 32, described below, may also be formed out of the same sheet constituting the side surfaces.

Two sheet metal plates 27 form the two end surfaces 24, 26 of the structural element. The plates 27 include a single sheet of metal surrounded by four side surfaces 28a-28d which form a 90 degree angle with respect to each adjacent side surface. All of these side surfaces also form a 90 degree angle with respect to the flat piece of sheet metal 27 constituting the end surface. In the preferred embodiment, the side surfaces are integrally formed with the end surfaces.

The side surfaces 28a-28d are spot welded to both the side and bottom surfaces 14, 16, 18 as well as to a top surface 32. The top surface 32 is spot welded, preferably where indicated by X's to the lips 20, 22 as well as to the surface 28d of each baffle. Thus the specific design of the side surfaces 14, 16 with lips 20, 22 and the use of these baffles greatly facilitates the simple spot welding of these components. As discussed above, however, the structural element 12 may be constructed without lips, and the top surface 32 may be integrally formed with one or more other surfaces.

Intermediate baffles 34, preferably having the same shape as the plates 27 are positioned at intermediate locations within the structural element 12 in order to increase torsional and bending stiffness. The side surfaces 35a-35d of intermediate baffles 34 are also spot welded to walls 14, 16, 18 and 32.

Figure 6:
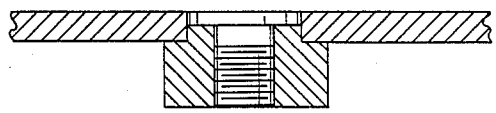
FIG. 6 is a sectional view through a typical weld nut utilized for attaching parts of subassemblies to the main structure of the machine tool shown in FIG. 1.

A way system comprising rails 42 and carriages 44 is mounted on a structural element such as the main structural body 12 to provide precision relative movement between components of a machine tool. In order to attach various parts or subassembliles such as the rails 42 and carriages 44 to the main structural element 12, several prepunched holes are provided in the sheet metal. Weld nuts, as shown in FIG. 6, are then installed in the prepunched holes to complete the attachment of various parts or subassemblies to either the main structure or to each other.

Figure 4:
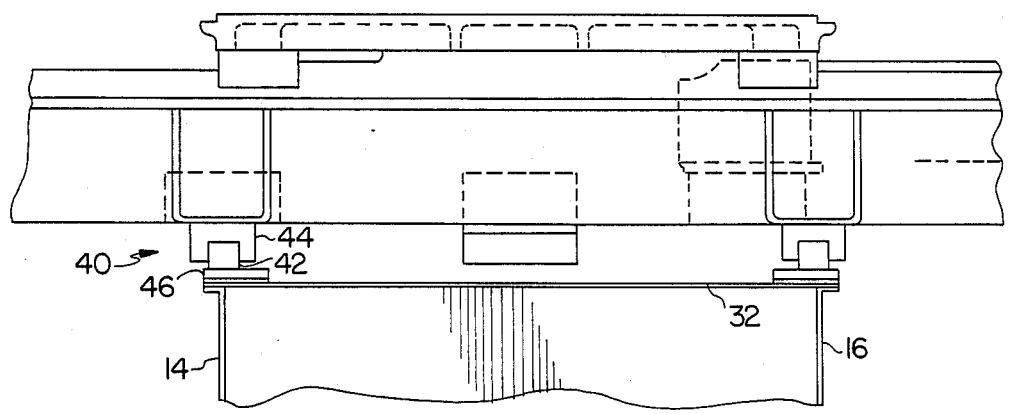
FIG. 4 is an elevational view of the way system of the machine tool shown in FIG. 1.
Figure 5:
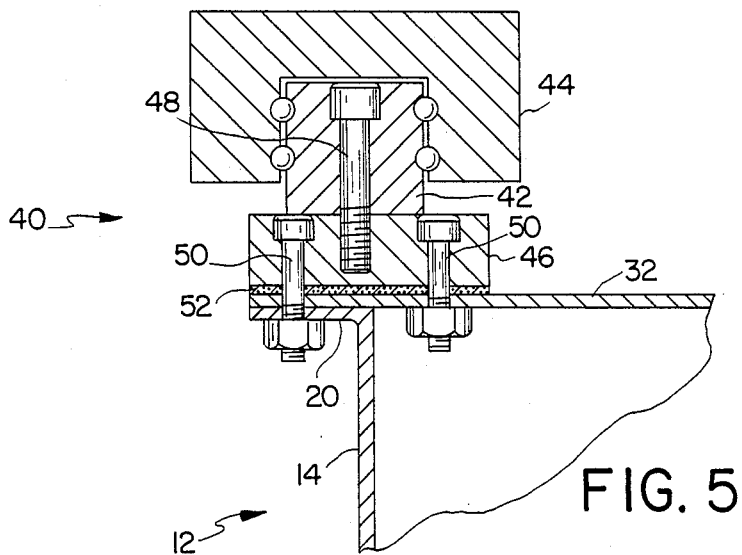
FIG. 5 is a cross-sectional view of a way system attached to the main structure of the machine tool shown in FIG. 1.

Referring to FIGS. 4–5, a way system 40 is shown in greater detail attached to the main structure 12. The way system 40 includes a precision guide rail 42 and its associated carriage 44. The guide rail and carriage may be any commercially available combination which may be attached in conventional fashion to a machine tool. A steel bar 46 is provided between the rail 42 and the top surface 32 in order to attach the rail to the main structure. The steel bar 46 is pre-machined to fasten to the main structure 12 and to accept the bolts 48 of the guide rail 42. The steel bar 46 in turn is bolted to the main structure 12 with bolts 50 and a thick film 52 of an epoxy-based material, such as a material that is commercially available from Diament Metallplastic GmbH under the trademark "MOGLICE", is placed between the steel bar 46 and top surface 32. The expoxy-based material must have a high compressive modulus when cured and must display uniform (and preferably low) shrinkage during curing. In particular, the material should provide a compressive modulus of greater than 500,000 psi (MOGLICE provides a compressive modulus of approximately 780,000 psi). These features enable the film 52 of epoxy based material to fill substantial gaps to account for the uneven mating of the two components (top surface 32 and steel bar 46) to be joined. The use of this material is necessitated by the fact that the sheet metal cannot be machined to a fine finish for a perfect mating with another component. The steel bar 46, on the other hand, can be machined to achieve an accurate alignment between the bar 46 and the rail or carriage connected to it.

Figure 3:
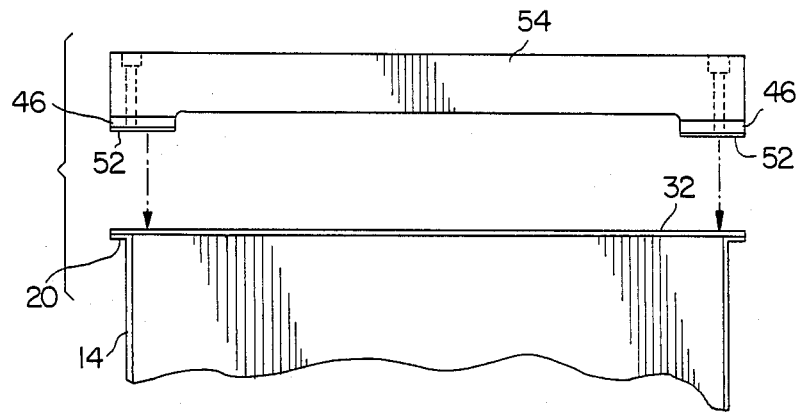
FIG. 3 is an elevational view of the fixture utilized to attach guide rail support strips of the machine tool shown in FIG. 1.

FIG. 3 shows the fixturing utilized to attach the guide rail support strips 46. A precision machine fixture 54 to which the guide bar attachment strips 46 are attached is provided to enable the guard bar attachment strips 46 to be held with the upper surface flat and precisely in line with each other. During assembly the epoxy material 52 is applied to the upper surface 32, and the fixture 54 with the bars attached is lowered onto the upper surface 32. When the epoxy has cured, the fixture 54 is removed and the bolts 50 shown in FIG. 5 are installed to permanently secure the bars to the main structure.

The structural elements 12 of the present invention provides several essential features not found in any prior art machine tools. The structural elements provide a new and very economical way to construct very accurate machinery utilizing linear way systems, and requiring high stiffness and low mass. The combination of sheet metal box sections, spot welding and fixtured bedding or attachment of components results in low mass and very stiff structural components. Furthermore, the use of sheet steel which is easily sheared and folded to allow easy access for spot welding makes the manufacture of the structural elements feasible. Stiffening baffles which are located in intermediate locations along the length of a structural component and which are spot welded in place provide the necessary added stiffness to the structure. Weld nuts economically installed where required for attachments avoid the necessity to machine the large fabricated structure, and the use of epoxy bedding material to install premachined surfaces or components to the structure in an accurate relationship without inducing stress into the structure further enhances the precision and accuracy of the resulting structure. The individual items, e.g. the way support or drive housing, are much less expensively machined initially than if done when attached. Thus, in summary the structural components of the present invention are economically fabricated as very stiff yet very light structures that are essentially free of internal stresses and enable the accurate attaching of linear way systems without costly machining.

While the foregoing invention has been described with reference to its preferred embodiments, various alterations and modifications will occur to those skilled in the art. For example, while the structural element has been described as being applied to machine tools, it should be understood that such structural elements may be utilized in any mechanical equipment requiring linear guide systems. Also, while the invention has been described in terms of the main structural element 12, any structural component of a machine tool such as the column 60 and the z axis slide 62 may be constructed in a similar fashion. Such a construction is particularly advantageous when the component is a moving element requiring the lowest possible inertia and a high degree of stiffness. Moreover, structures having a number of sides other than four are also deemed to fall within the scope of the invention. These and other such alterations and modifications are intended to fall within the scope of the appended claims.

What is claimed is:

1. A structural element for supporting a precision linear motion system while allowing linear motion of the system comprising:
    (1) a closed box, said box being formed from at least one sheet of sheet metal sheared and bent to form essentially parallel first and second side wall surfaces which are perpendicular to a third wall surface to form an essentially U-shaped structure having a flat third wall surface and two perpendicular first and second side wall surfaces; said closed box being closed at each end by end surface members, each end surface member being formed from a flat piece of end sheet metal having a rim running along its periphery whose plane is perpendicular to the plane formed by said end sheet metal, each of said end surface members being sized to fit within said U-shaped structure to close off both ends of said closed box, the rim being spot welded to said U-shaped structure; one or more baffles, each baffle being formed from a flat piece of baffle sheet metal having a rim running along its periphery whose plane is perpendicular to the plane formed by said baffle sheet metal, said baffles being spot welded to inner walls of said U-shaped structure and being oriented in a plane parallel to said end surface members to provide structural support for a linear motion system; and a sheet metal fourth wall surface oriented in a plane parallel to the third wall surface said first and second side wall surface have top edges which are bent to form lips, said lips extending in directions away from each other along each outside wall of said U-shaped structure and forming essentially right angles with said outside wall to support said sheet metal fourth surface, and being supported by the rims of said end surface members and by the rims of said baffles and joining said first and second side wall surfaces, and being spot welded along the rims of the end surface members to close said box; and
    (2) a way system attached to a wall surface to provide means for movably supporting a precision linear motion system,
the combination of the sheet metal wall surfaces and said end surface members and said baffles forming a structure which is light in weight but provides acceptable rigidity for supporting a precision linear motion system while allowing linear motion.

2. The structural element of claim 1 wherein said sheet metal fourth wall surface is the top of said structural element.

3. The structural element of claim 2 wherein said sheet metal top contains prepunched holes in selected locations.

4. The structural element of claim 3 wherein said way system includes precision guide rails and associated carriage assemblies.

5. The structural element of claim 4 further comprising weld nuts received in said prepunched holes for fastening components and subassemblies of a way system to each other to said closed box.

6. The structural element of claim 5 wherein said sheets of sheet metal are formed of steel.

7. A method of forming a structural element which is light in weight and capable of providing support for a precision linear motion system and which can serve as a replacement for heavier steel supporting systems while allowing linear motion of a linear motion system comprising the steps of:
    bending at least one sheet of sheet metal to form essentially parallel first and second side wall surfaces which are perpendicular to a third wall surface to form an essentially U-shaped structure having a flat third wall surface and two perpendicular first and second side wall surfaces;
    spot welding end surface members to said U-shaped structure, said end surface members being sized to fit within said U-shaped structure and being formed from a flat piece of ends sheet metal having a rim running along its periphery whose plane is perpendicular to the plane formed by said end sheet metal;
    spot welding baffles to inner walls of said U-shaped structure in a plane parallel to said end surface members to provide structural support for a linear motion system, said baffles being formed from a flat piece of baffle sheet metal having a rim running along it periphery whose plane is perpendicular to the plane formed by said baffle sheet metal;
    and spot welding a sheet metal fourth wall surface along said rims of said end surface members to join said first and second side wall surfaces to form a closed box and bending top edges of said first and second side wall surface to form lips which extend in directions away from each other along each outside wall of said U-shaped structure and forming essentially right angles with said outside walls and attaching said sheet metal fourth surface to said U-shaped structure in a manner such that it is supported by said lips and spot welding said fourth wall surface to said lips.

8. The method of forming a structural element of claim 7 further comprising the step of providing prepunched holes in selected locations along said sheet metal fourth wall surface.

* * * * *